United States Patent [19]
Klassen

[11] Patent Number: 6,056,355
[45] Date of Patent: May 2, 2000

[54] INFANT CAR SEAT COVER

[76] Inventor: Elizabeth A Klassen, 3304 Menno Street Box210, Vineland, Ontario, Canada, L0R 2C0

[21] Appl. No.: 09/217,510

[22] Filed: Dec. 21, 1998

[51] Int. Cl.[7] .............................. A47C 7/66; A47C 29/00
[52] U.S. Cl. ................................. 297/184.13; 297/184.1; 297/184.11; 297/184.14
[58] Field of Search ........................... 297/184.13, 184.1, 297/184.11, 184.14, 219.12, 464, 487; 135/117, 93

[56] References Cited

U.S. PATENT DOCUMENTS

| 2,615,458 | 10/1952 | Jones ................................ 135/117 X |
| 3,621,857 | 11/1971 | May et al. .......................... 135/117 X |
| 3,990,463 | 11/1976 | Norman ............................. 135/93 X |
| 4,478,453 | 10/1984 | Schutz ............................. 297/219.12 |
| 4,579,385 | 4/1986 | Koenig ............................ 297/184.13 X |
| 4,891,454 | 1/1990 | Perdelwitz, Jr. et al. ......... 297/219.12 |
| 4,946,221 | 8/1990 | Livingston ........................ 297/184.13 |
| 4,993,090 | 2/1991 | Ranalli . |
| 5,074,616 | 12/1991 | Smith ............................... 297/184.13 |
| 5,150,945 | 9/1992 | Aupperlee et al. ................ 297/184.13 |
| 5,243,724 | 9/1993 | Barnes ............................. 297/219.12 |
| 5,309,586 | 5/1994 | Sies et al. ....................... 297/184.13 X |
| 5,467,794 | 11/1995 | Zheng ................................ 135/117 X |
| 5,522,639 | 6/1996 | Jaime ............................. 297/184.13 |
| 5,549,354 | 8/1996 | Rosen ............................. 297/184.11 X |
| 5,611,095 | 3/1997 | Schneider . |
| 5,652,960 | 8/1997 | Kaknevicius ................... 297/184.11 X |
| 5,730,490 | 3/1998 | Mortenson ........................ 297/184.13 |
| 5,781,946 | 7/1998 | McEntire et al. . |
| 5,806,924 | 9/1998 | Gonas ............................. 297/184.13 X |
| 5,918,615 | 7/1999 | Stuck, Sr. .......................... 135/117 X |

Primary Examiner—Peter M. Cuomo
Assistant Examiner—Rodney B. White
Attorney, Agent, or Firm—Michael I. Kroll

[57] ABSTRACT

The present disclosure pertains to a cover 10 for an infant car seat 12 having an elasticized opening 28 on its bottom which has an elastic hem 16 for being slipped over and secured around the infant car seat 12 without disengaging the safety belts of the seat. A second opening 18 is provided on the top of the cover for allowing access to the infant 14. This second opening 18 is equipped with a flap 20 which attaches to the cover 10 using mating hook and loop material 26 for selectively opening and closing the flap 20. The flap 20 also has an additional opening 22 in it having a meshed cover 24 so that when the flap 20 is closed over the infant 14 the meshed opening 22 allows air circulation and ventilation to the infant 14 for breathing and cooling.

1 Claim, 7 Drawing Sheets

INFANT CAR SEAT COVER

BACKGROUND OF THE INVENTION

1. Field of the Invention

The present invention relates generally to covers for infant car seats and, more particularly, to an infant and infant car seat cover having an elastic band enclosed within the hem of the cover and having a flap centrally located within the upper half of the cover with means for closure of said flap in the form of engaging mating pieces of hook and loop material located on the periphery of the flap and the centrally located opening of the infant cover and further said flap having an aperture located at the base of the flap providing air circulation within the infant cover when said flap is in the fully closed position thereby said flap selectively provides means for protecting newborns and infants from adverse conditions, such as rain and snow, while being transported between controlled environments, such as from the house to the car or any similar circumstance.

2. Description of the Prior Art

There are numerous infant car seat covers designed to provide for the comfort and protection of newborns and infants. Typical of these covers is U.S. Pat. No. 4,993,090 issued to Ranalli on Feb. 19, 1991.

Another patent was issued to Aupperlee et al on Sep. 29, 1992 as U.S. Pat. No. 5,150,945. Yet another U.S. Pat. No. 5,243,724 was issued to Barnes on Sep. 14, 1993. Still yet another U.S. Pat. No. 5,611,095 was issued to Schneider on Mar. 18, 1977. Another patent was issued to McEntire et al on Jul. 21, 1998 as U.S. Pat. No. 5,781,946. Yet another U.S. Pat. No. 4,478,453 was issued to Schutz on Oct. 23, 1984 and still yet another U.S. Pat. No. 4,891,454 was issued to Perdelwitz, Jr. et al on Jan. 2, 1990.

U.S. Pat. No. 4,993,090

Inventor: Tracey L. Ranalli

Issued: Feb. 19, 1991

A blanket for covering a child in a car seat fitted with a harness for restraining the child in the seat. The blanket comprises a plurality of apertures through which restraining members of the harness can be passed, thus enabling the harness to be fastened tightly around the child, and the blanket then to be wrapped around the child and harness.

U.S. Pat. No. 5,150,945

Inventor: Patricia C. Aupperlee et al.

Issued: Sep. 29, 1992

A vehicular safety seat for a child may be exposed to the sun to such an extent that certain portions will be hot enough to burn a child. A removable cover is provided that covers all areas of the seat when unoccupied. Because the cover must be applied and removed while holding the child, special structure is provided so that these tasks may be performed with one hand. A combined storage pouch/pillow is attached to the upper or backrest portion of the cover. While the upper portion of the cover remains attached to the safety seat, the balance of the cover may be removed from the seat and stuffed into the pouch with one hand to form a soft pillow for the cover since the upper portion remains attached to the child seat in both the covered and uncovered mode. Arrangements for holding the cover in place on the child seat are provided.

U.S. Pat. No. 5,243,724

Inventor: Evelyn R. Barnes

Issued: Sep. 14, 1993

A multi-purpose baby wrap which converts to a blanket, a bunting, a pad or a carrier sling. The wrap comprises two major parts: a full sized baby blanket and a large detachable, bifurcated pocket. The pocket covers the lower half of the blanket and is sized to fit children from birth to about two years, with the pocket covering the child's legs and torso up to the waist. A baby's diaper may be changed without removing the baby from the wrap by simply unfastening the bottom and sides of the pocket and lifting it to expose the lower half of the baby. For use of the wrap as a bunting. The baby is placed feet first in the pocket; the blanket is then rolled around the baby and secured snugly about his or her midriff with one or two short straps. With the blanket so secured, the apparatus in plan view presents the appearance of a rectangle. At each corner of the rectangle a fastener is provided for attaching a pair of elongated straps to the wrap. Crossed in the center, these elongated straps, with the wrap, form a sling for carrying the baby. Alternately, for transport of an infant in a car seat or stroller, the wrap is equipped with overlapping openings formed in the blanket and in the pocket, respectively. These openings allow a safety belt for the car seat or stroller to be inserted between the baby's legs.

U.S. Pat. No. 5,611,095

Inventor: Dena Schneider

Issued: Mar. 18, 1997

This invention relates to a multi-purpose baby wrap which converts to a blanket, a bunting, a pad, a fitted wrap, or a shoulder wrap, to provide warmth and/or protection from the elements. A hood (either detachable or integral) may also be provided. It is adaptable for use with a child's car seat (or the like) which is fitted with a restraint system, a front or back carrying pack for carrying infants or toddlers, a stroller or walker, a swing or jumping unit which contains a child, a grocery cart, a high chair, or like equipment in which the infant's legs must be separated.

U.S. Pat. No. 5,781,946

Inventor: Wanda M. McEntire, et al

Issued: Jul. 21, 1998

A novel blanket/seat cover (7) for portable infant car seat or apparatus comprising of a flat cross-shaped member (8) having a mid section area (9). A right side extension (10). A left side extension (11), a lower extension (12) and an upper extension (13) each extension having a fold line (24) common to said mid section area (9) allowing each extension to be folded, a strap (14) located on each side of said mid section area (9), a leg pocket member (15) having an attachment means to said flat cross-shaped member (8) with upper edge unattached, a slit (20) at center of said leg pocket member (15), a central opening (16) to accommodate shoulder-body strap locking device, a storage pocket member (17) having an attachment means to said flat cross-shaped member (8) with lower edge unattached, a storage pocket closure member (19) having an attachment means to said flat cross-shaped member (8) with upper edge and both sides unattached of said storage pocket closure member (19) having an attachment means for storage pocket (18) allowing said storage closure member (19) to engage and disengage with said storage pocket member (17), a filler (21) is used when a double layer of said flat cross-shaped member (8) is employed, no filler (21) if single layer, said flat cross-shaped member (8) having an edge (22) typical at all edges with an attachment means for edging (23).

U.S. Pat. No. 4,478,453

Inventor: Bernard R. Schutz

Issued: Oct. 23, 1984

The cover has front and rear sections joined along the top to form a recess into which the upper part of the back and the forwardly extending sides (if present) of the infant car seat are received. The rear section has spaced first portions partially defining the ends of the recess. Each first portion has a set of outwardly extending, spaced connecting strips to permit alteration of the effective size and shape of the respective recess ends. If no forwardly extending sides are present, the strips interconnect to fold each of the first portions over itself and hold some adjacent the rear of the seat. A second portion, situated between the first portions, has differently spaced pairs of interengaging snaps for altering the effective length thereof An elastic strip, situated along the edge of the rear section, permits expansion of the recess to facilitate mounting of the cover and to maintain the edge of the rear section adjacent the back of the seat.

U.S. Pat. No. 4,891,454

Inventor: Lee E. Perdelwitz, Jr. et al.

Issued: Jan. 2, 1990

A disposable infant seat liner is described with shoulder strap receiving slotways and leg or crotch strap receiving slotways designed to fit infant seat liners having various strap placements. Infant carrier handle or strap receiving slotways may also be included, and may be of an arcuate shape, for receiving infant carrier handles or waists straps. The strap receiving slotways may be selectively opened by a user and may also be perforated to facilitate this selective opening.

While these infant and infant car seat covers may be suitable for the purposes for which they were designed, they would not be as suitable for the purposes of the present invention, as hereinafter described.

SUMMARY OF THE PRESENT INVENTION

The present invention discloses a cover for an infant car seat having an elasticized opening on its bottom which has an elastic hem for being slipped over and secured around the infant car seat without disengaging the safety belts of the seat. A second opening is provided on the top of the cover for allowing access to the infant. This second opening is equipped with a flap which attaches to the cover using mating hook and loop material for selectively opening and closing the flap. The flap also has an additional opening in it having a meshed cover so that when the flap is closed over the infant the meshed opening allows air circulation and ventilation to the infant for breathing and cooling.

A primary object of the present invention is to provide an infant cover which can be placed over an infant and an infant car seat.

Another object of the present invention is to provide an infant cover having a flap which can be selectively opened and closed to provide protection to the newborn or infant from adverse conditions.

Yet another object of the present invention is to provide an infant cover having a flap which can be selectively opened and closed to provide protection to the newborn or infant from adverse conditions and wherein said flap having an aperture which may be covered by a mesh-like material for air circulation when said flap is in the fully closed position.

Still yet another object of the present invention is to provide an infant cover which can easily and quickly be placed over a newborn or infant without disengaging the safety measures of the car seat.

Additional objects of the present invention will appear as the description proceeds.

The present invention overcomes the shortcomings of the prior art by providing an infant and infant seat cover which can be easily installed and removed from various types of car seats without disengaging the safety harness of the car seat. Further, the infant cover provides a large flap centrally located on the top half of the infant cover which can be easily engaged or disengaged using the tabs of hook and loop material located on the periphery of the opening and the flap which provides full or partial closure of the flap to protect the newborn or infant from adverse conditions and wherein said flap provides means for air circulation by having an aperture located at the base of said flap and wherein said aperture may be covered by a mesh-like material.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

Turning now descriptively to the drawings, in which similar reference characters denote similar elements throughout the several views, FIGS. 1 through 7 illustrate the present invention. With regard to the reference numerals used, the following numbering is used throughout the various drawings.

Figure 1:
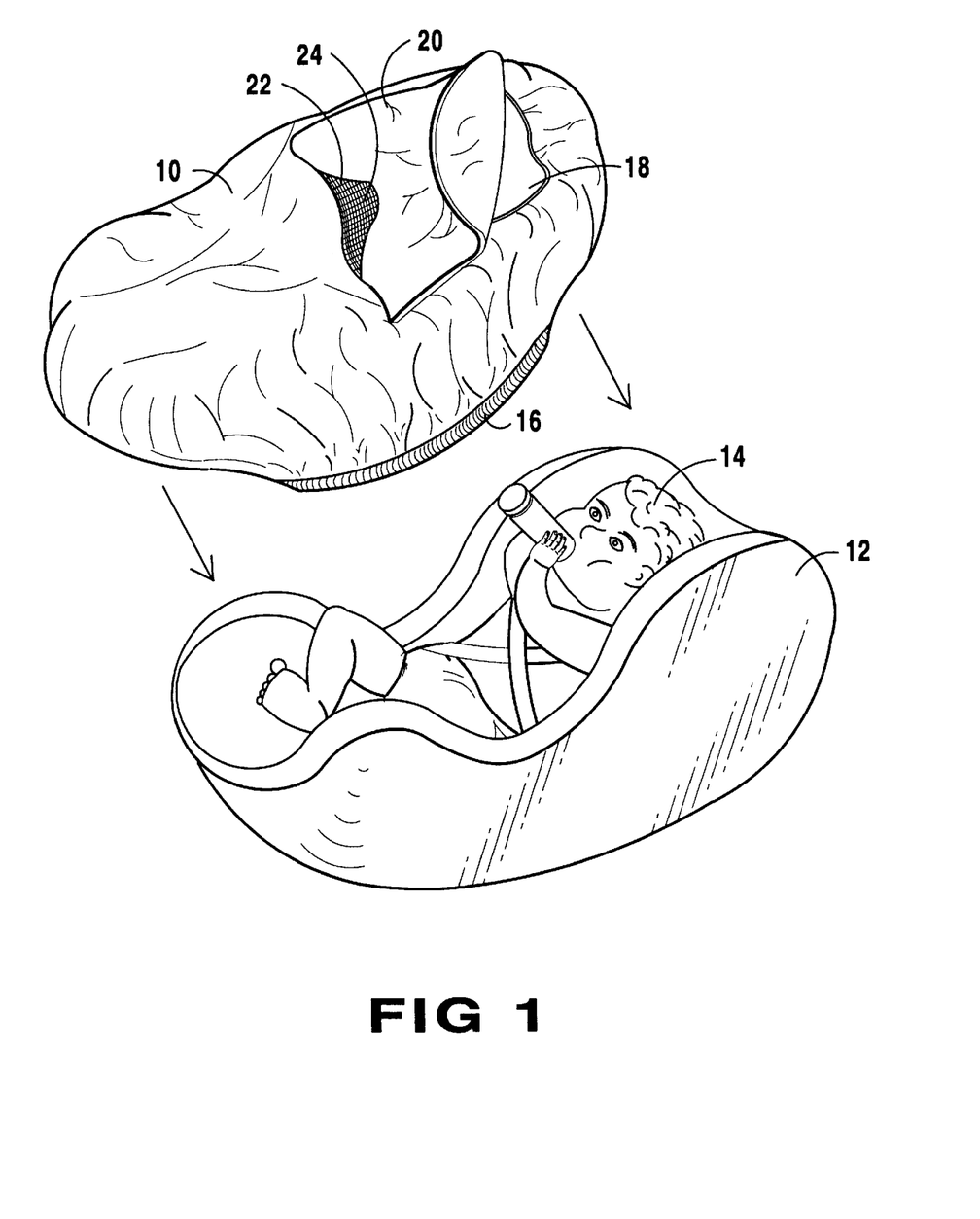
FIG. 1 is a perspective view of an infant in a car seat with the present invention in a pre-installation position.

10 cover of present invention
12 car seat
14 infant
16 elastic hem
18 upper opening for infant
20 flap
22 ventilation opening
24 mesh
26 hook and loop material
28 bottom opening Turning to FIG. 1, therein is shown a perspective view of the cover of the present invention 10 along with a car seat 12 having an infant 14 strapped therein. The present invention 10 is shown as it would appear in a pre-installation position. The cover of the present invention 10 has a first opening (not shown) on its bottom or lower side having an elastomeric member sewn within the hem 16 around its periphery which can be stretched to allow the cover 10 to be slipped over and secured to the car seat 12 without disengaging the child restraint harness. On the top or upper side of the present invention the cover has a second generally centrally located opening 18 which is covered by a flap 20, which flap 20 has a third smaller opening therein 22. As can be seen in FIG. 1, the opening 22 has a meshed screen material 24 over the opening 22 for air circulation to the infant.

Figure 2:
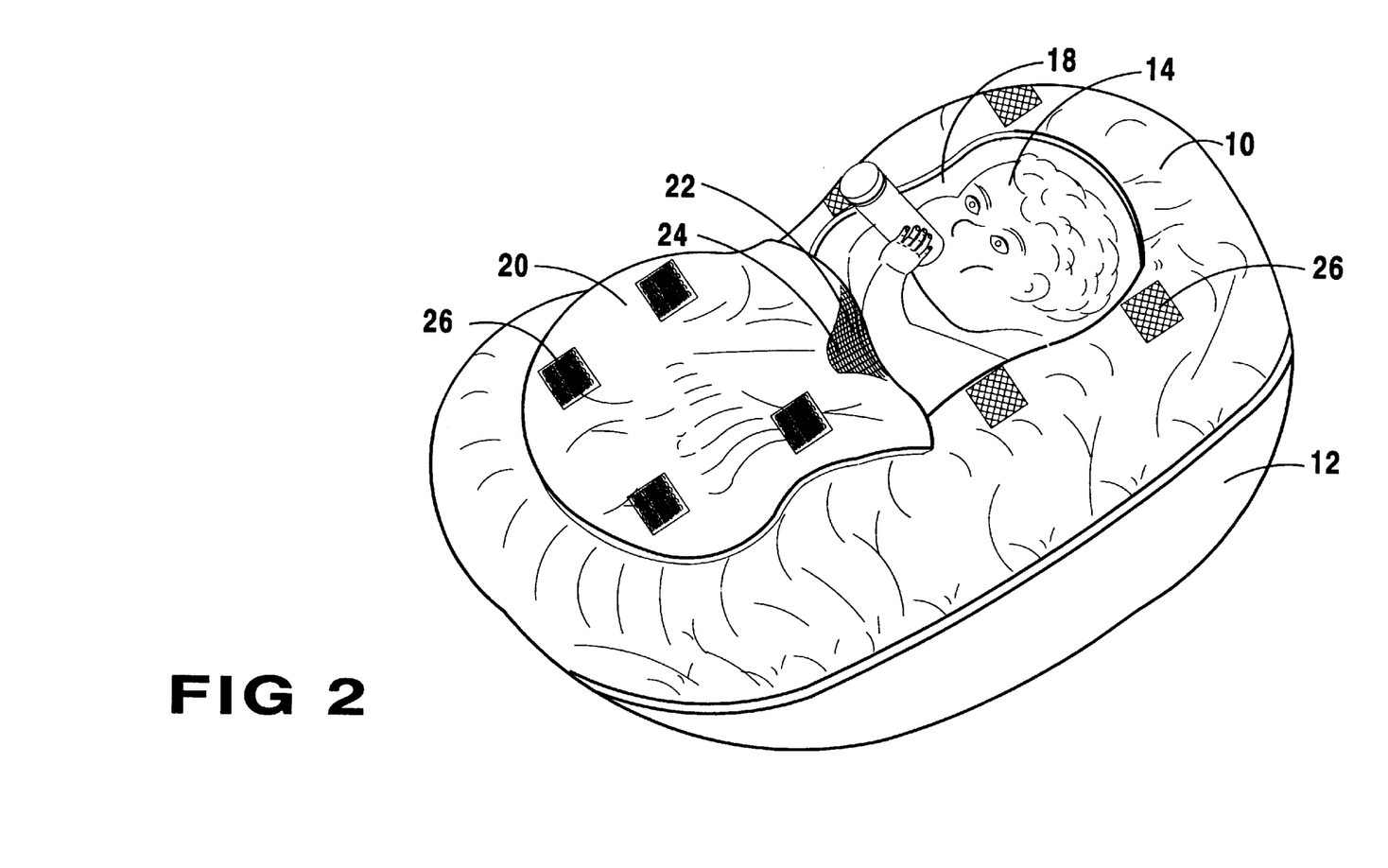
FIG. 2 is a perspective view of the present invention installed over an infant in a car seat with the flap in its fully open position.

Turning to FIG. 2, therein is shown a perspective view of the present invention 10 installed over an infant 14 in a car seat 12 with the flap 20 in its fully opened position. Shown therein is the upper opening 18 of the cover which allows the infant to see, take a bottle, eat, breathe and have access to and be accessed from the outside. Also shown therein is the opening 22 on the flap 20 and the mesh 24 within the opening 22. Further shown is the hook and loop fastening means 26 for attaching the flap 20 to the cover 10. Note there are multiple attachment points 26 and that the hook and loop material 26 is located on the periphery of the opening 18 and the flap 20. By selectively attaching or mating the hook and loop material 26 fill to partial closure of the flap 20 can be accomplished.

Figure 3:
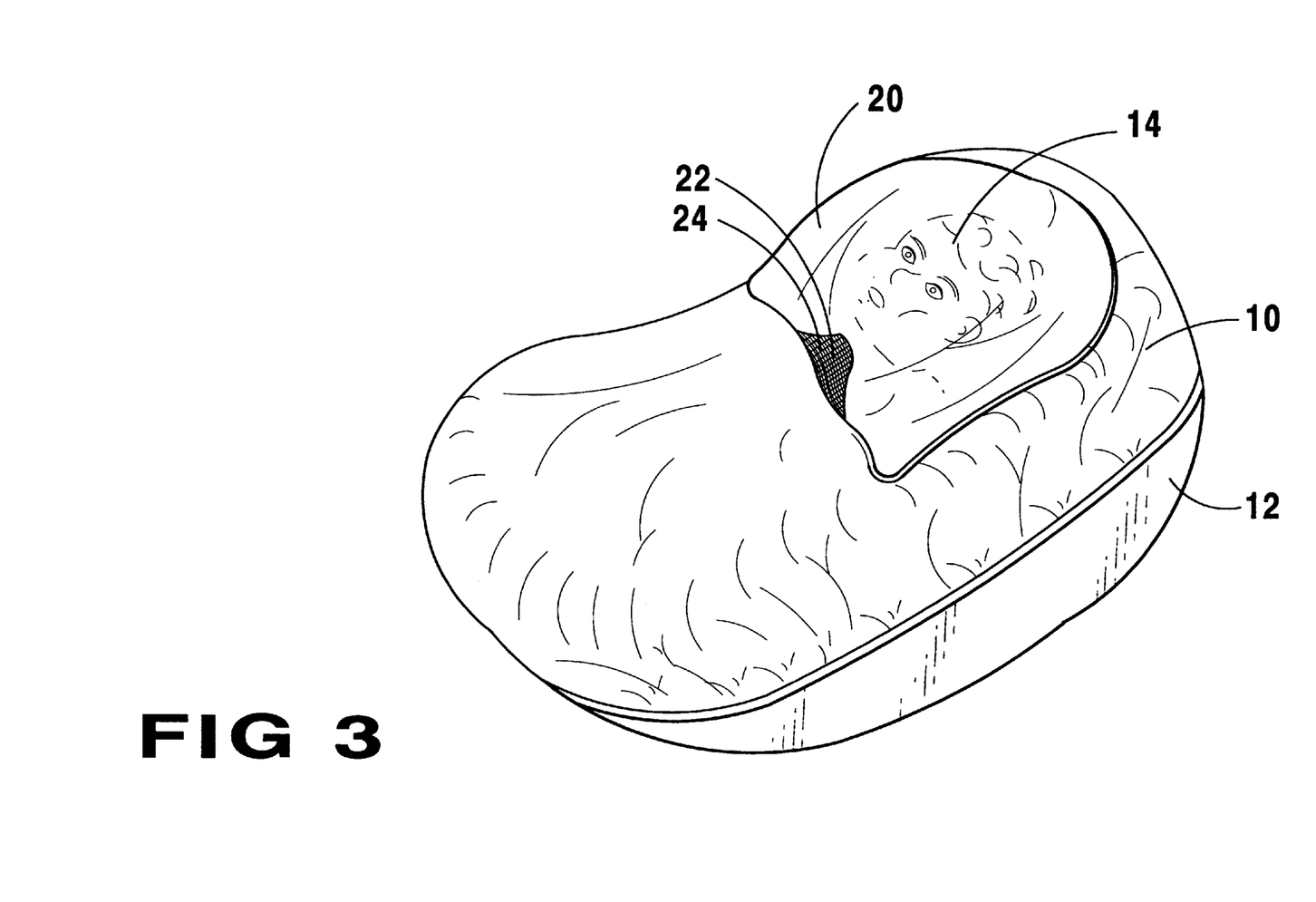
FIG. 3 is a perspective view of the present invention installed over an infant in a car seat with the flap in its fully closed position.

Turning to FIG. 3, therein is shown a perspective view of the present invention 10 installed over an infant 14 shown in outline only. Also shown therein is the car seat 12 with the flap 20 in its fully closed position. Also shown therein is the opening 22 of the flap along with the mesh 24 of the flap opening. In the closed position the flap 20 protects the infant 14 from the elements, such as rain, sleet or snow, while transporting the infant between controlled environments, such as from the outside of the home to the interior of the home.

Figure 4:
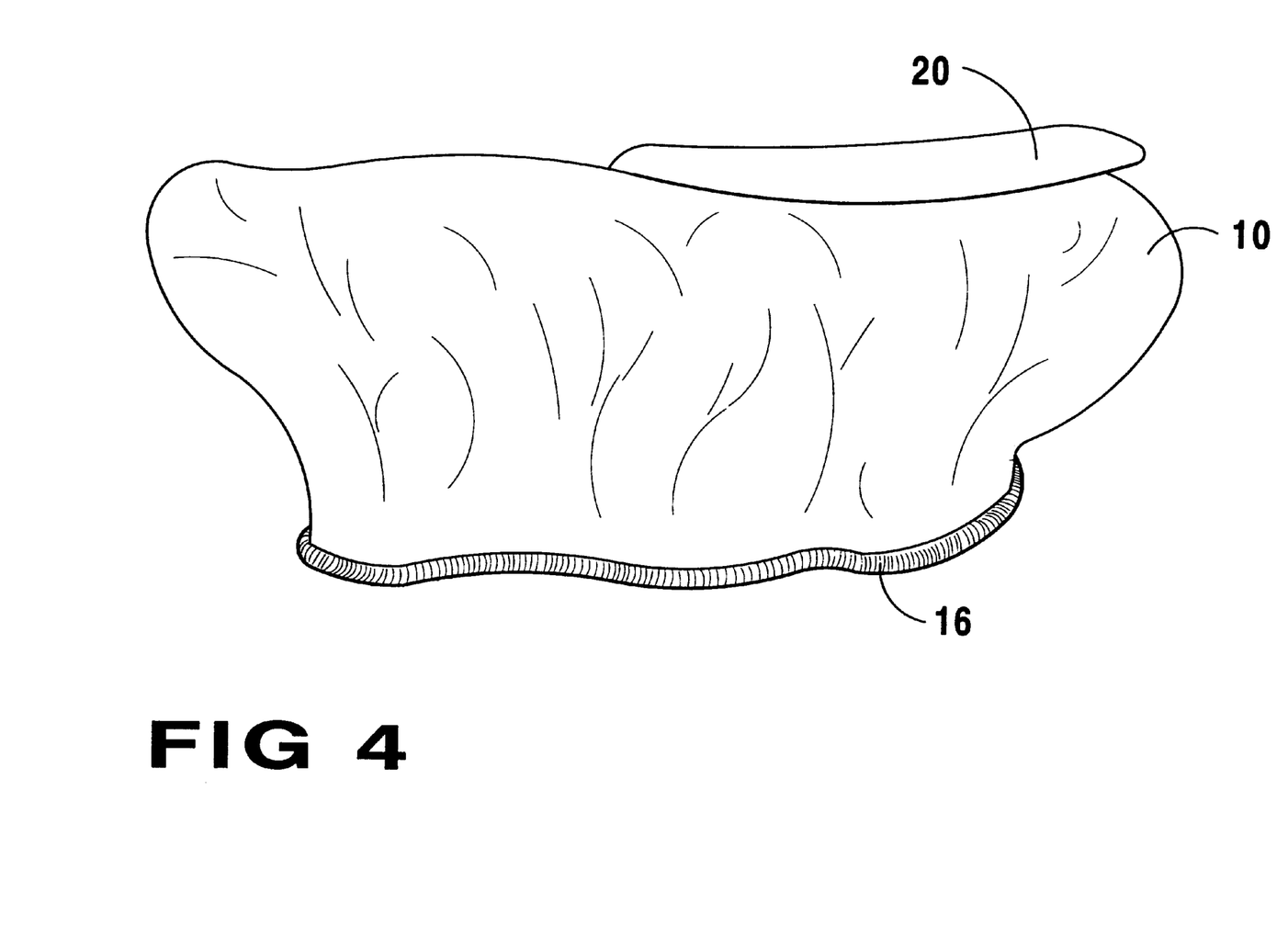
FIG. 4 is a side view of the present invention. Shown is the infant car seat cover which is placed over the infant car seat after the infant has been securely placed within the car seat.

Turning to FIG. 4, therein is shown a side view of the present invention 10. Shown is the infant car seat cover 10 which is placed over the infant car seat (not shown) after the infant (not shown) has been secured in place in the car seat. Also shown therein is the elastic hem 16 along with the flap 20 shown in a closed position. It should be clear that the cover 10 can be placed over the car seat by stretching the elastic hem 16 over and around the car seat in such a manner so as not to disengage the child restraint harness.

Figure 5:
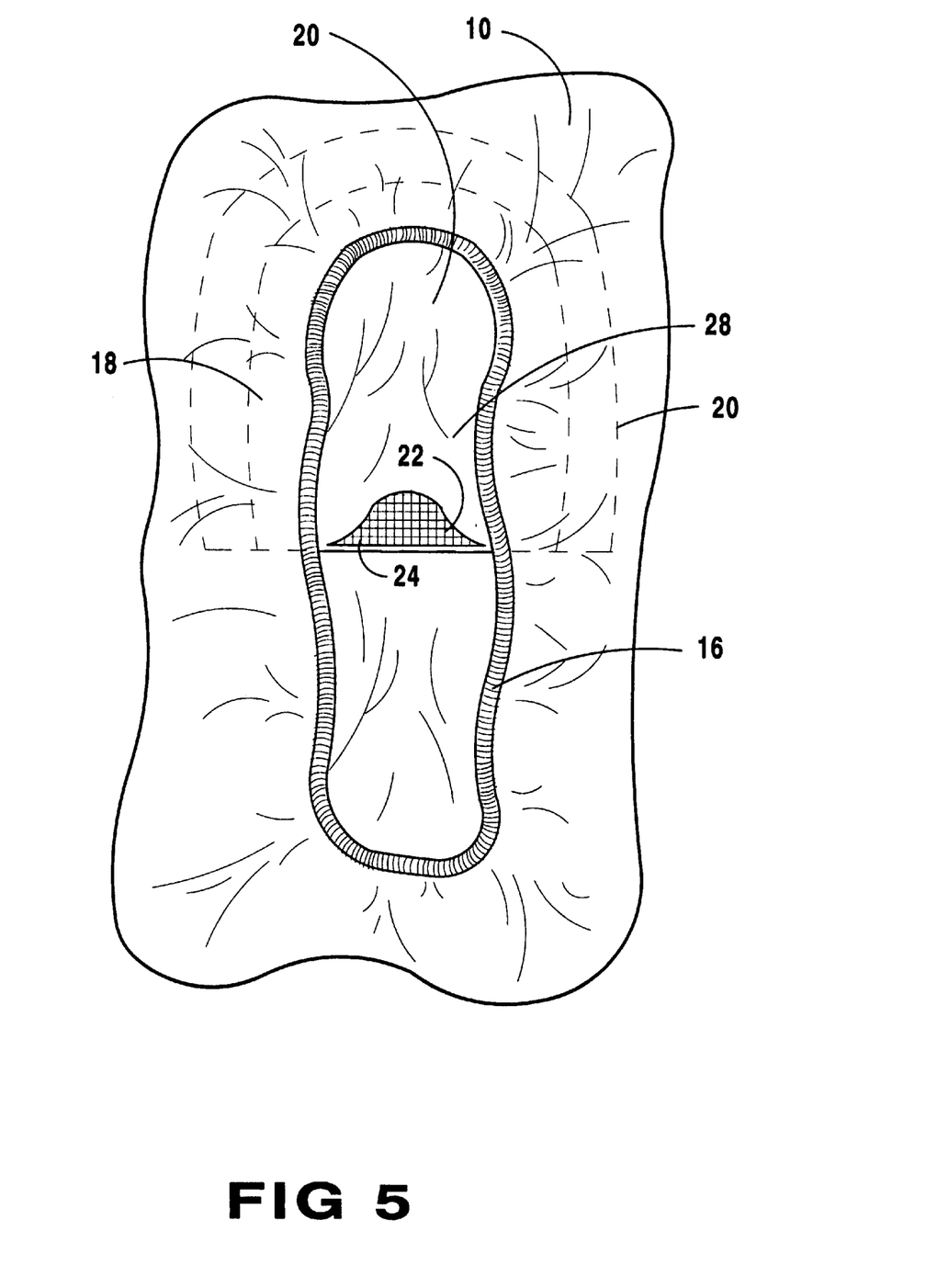
FIG. 5 is a bottom view of the present invention. Shown is the elastomeric member which is used to keep the infant car seat cover securely in place over various types of seats.

Turning to FIG. 5, therein is shown a perspective view of the present invention 10. Shown is the elastomeric member 16 which is used to keep the infant car seat cover securely in place over various types of car seats (not shown). It should be clear that the elastic hem 16 allows the cover 10 to be used with many different and varying styles of infant car seats. Also shown is the bottom opening 28 along with the upper opening 18 shown in outline and the flap 20. Also shown is the second opening 22 on the flap 20, along with the mesh 24 covering the opening 22.

Figure 6:
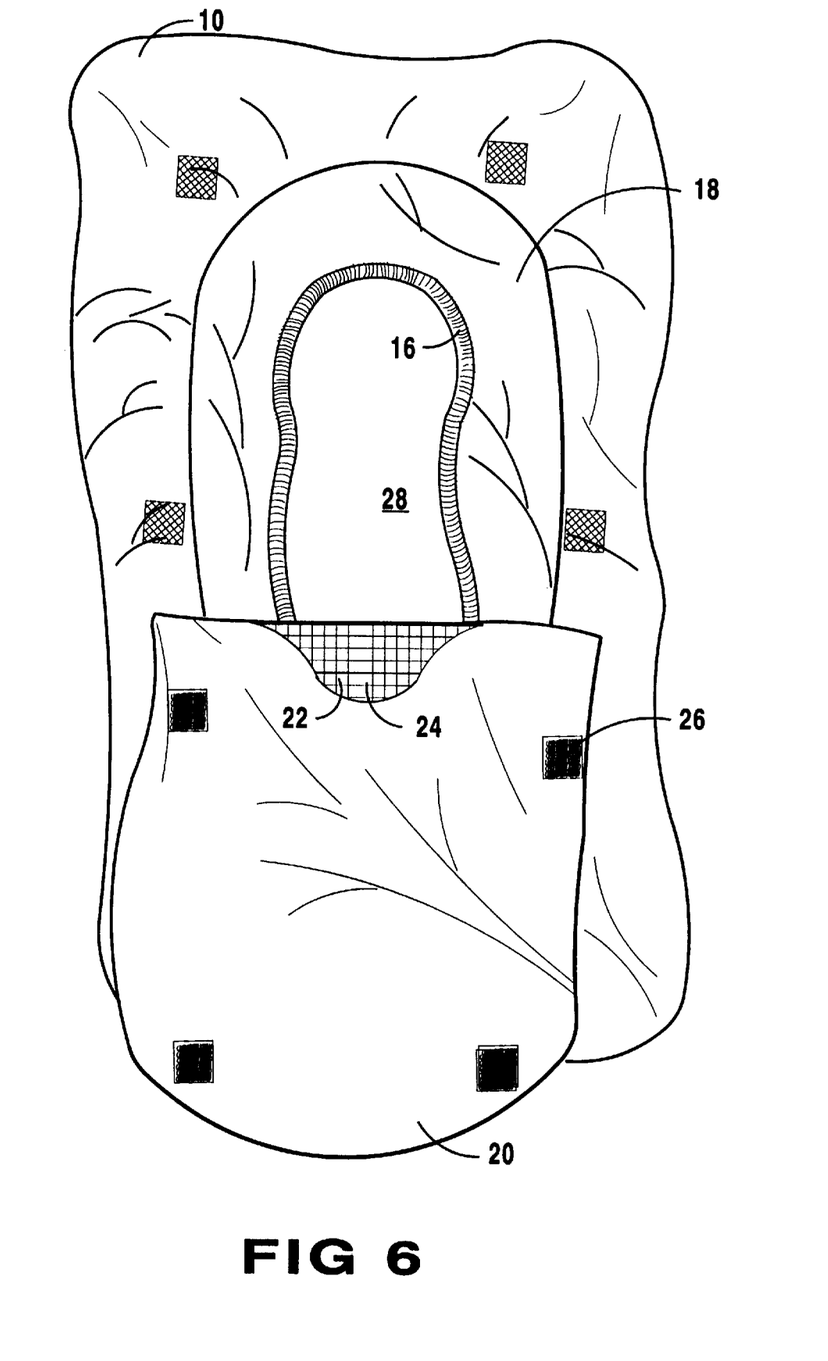
FIG. 6 is a top view of the present invention. Shown is the infant car seat cover with the flap in the fully open position. Also shown are the mating tabs of hook and loop material which are used to securely fasten the flap in a partial open to a fully closed position.

Turning to FIG. 6, therein is shown a top view of the present invention 10. Shown is the infant car seat cover 10 with the flap 20 in the fully opened position. Also shown are the mating tabs of hook and loop material 26 which are used to secure the flap 20 in a partially opened to a fully closed position by selectively attaching the mating hook and loop material 26. This is accomplished in operation by attaching only the lower pieces of the hook and loop material to leave the upper part of the opening unattached and therefore open. Also shown therein is the opening 18 for the infant along with the elastic hem 16 and the bottom opening 28. Also shown therein is the opening 22 on the flap 20 having the meshed material 24 in the opening 22.

Figure 7:
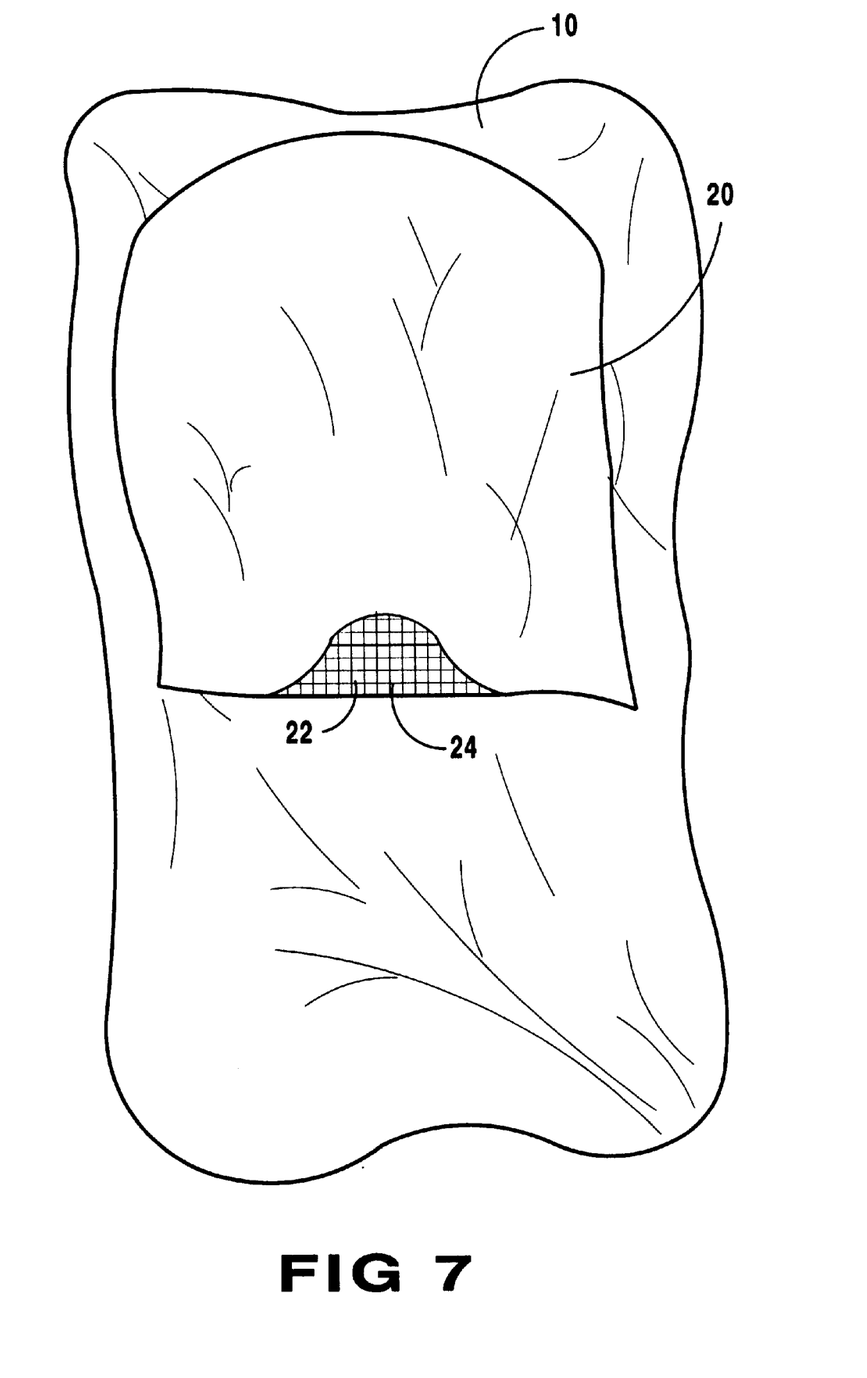
FIG. 7 is a top view of the present invention. Shown is the infant car seat cover with the flap in the fully closed position. Also shown is a vent which can be covered by a mesh material which provides ventilation to the newborn or infant while the flap is securely closed.

Turning to FIG. 7, therein is shown a top view of the present invention 10. Therein is shown the infant car seat cover 10 with the flap 20 in a fully closed position. Also shown is the opening 22 which can be covered by a mesh material 24 which provides ventilation to the newborn or infant (not shown) while the flap 20 is securely closed.

What is claimed to be new and desired to be protected by Letters Patent is set forth in the claims:

1. An apparatus for covering a car seat, comprising:
   (a) means made from cloth for covering an infant car seat without disengaging any safety belts of the seat;
   (b) said means for covering having a first opening on a bottom side for being attached to the infant car seat;
   (c) said first opening having means comprising an elastic hem lining an edge of said first opening for attachment to an underside of the infant car seat;
   (d) said means for covering having a second opening centrally located in an upper side positioned to be over the head and arms of an infant in said car seat said second opening having a top side and two opposite sides;
   (e) said second opening having means for covering said second opening comprising a flap with a fold line forming a bottom side of said second opening and intended to be below the arms of the infant within said car seat;
   (f) said flap having a vent adjacent the fold line for providing ventilation for the child in the car seat to breath when the flap is closed;
   (g) said vent being covered with a mesh allowing air circulation through said vent; and (h) means for attaching said flap to said covering means when said flap closes said second opening comprising said flap overlapping the top and opposite sides of said second opening, multiple attachment points including spaced hook or loop segments on said covering means lining said second opening and corresponding loop or hook segments on said flap facing the hook or loop segments lining said second opening permitting said flap to be closed completely or partially and held secure in the completely or partially closed position.

* * * * *